United States Patent
Mizuno

(10) Patent No.: US 7,468,217 B2
(45) Date of Patent: Dec. 23, 2008

(54) SEPARATOR PASSAGE STRUCTURE OF FUEL CELL

(75) Inventor: Seiji Mizuno, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 620 days.

(21) Appl. No.: 10/777,726

(22) Filed: Feb. 13, 2004

(65) Prior Publication Data
US 2004/0161658 A1 Aug. 19, 2004

(30) Foreign Application Priority Data
Feb. 13, 2003 (JP) ............................. 2003-035273

(51) Int. Cl.
*H01M 2/16* (2006.01)
*H01M 2/18* (2006.01)

(52) U.S. Cl. ........................................................ 429/38

(58) Field of Classification Search ................... 429/38
See application file for complete search history.

(56) References Cited

U.S. PATENT DOCUMENTS

| | | | | |
|---|---|---|---|---|
| 4,292,379 A | * | 9/1981 | Kothmann | 429/17 |
| 6,649,297 B1 | * | 11/2003 | Marchand et al. | 429/34 |
| 6,780,536 B2 | * | 8/2004 | Debe et al. | 429/38 |
| 2004/0151970 A1 | * | 8/2004 | Ferguson | 429/38 |

FOREIGN PATENT DOCUMENTS

| | | |
|---|---|---|
| DE | 29 27 682 C2 | 1/1980 |
| DE | 101 27 322 A1 | 6/2001 |
| EP | 0 415 733 B1 | 10/1994 |
| JP | 10-172586 A | 6/1998 |
| JP | 10172586 A * | 6/1998 |
| JP | A-10-172586 | 6/1998 |
| JP | 11-016590 A | 1/1999 |
| JP | 2001-043870 A | 2/2001 |
| JP | 2001043870 A * | 2/2001 |
| JP | A-2002-198069 | 7/2002 |
| JP | A-2004-079245 | 3/2004 |

OTHER PUBLICATIONS

German Office Action and English Translation of the Office Action.
Japanese Language Version of Japanese Office Action for Appln. No. JP2003-035273 issued Nov. 28, 2006.
English Language Translation of Japanese Office Action for Appln. No. JP2003-035273 issued Nov. 28, 2006.

* cited by examiner

*Primary Examiner*—Tracy Dove
(74) *Attorney, Agent, or Firm*—Kenyon & Kenyon LLP

(57) ABSTRACT

A fuel cell according to an embodiment of the invention includes a separator on which a gas passage groove is formed. A cross sectional area of a gas passage changes in a direction in which the gas passage groove extends, while each of an opening width of the gas passage groove and a depth of the gas passage groove remains substantially constant.

3 Claims, 10 Drawing Sheets

SEPARATOR PASSAGE STRUCTURE OF FUEL CELL

INCORPORATION BY REFERENCE

The disclosure of Japanese Patent Application No. 2003-035273 filed on Feb. 13, 2003 including the specification, drawings and abstract is incorporated herein by reference in its entirety.

BACKGROUND OF THE INVENTION

1. Field of the Invention

The invention relates to a separator passage structure of a fuel cell. More particularly, the invention relates to a separator passage structure of a proton-exchange membrane fuel cell.

2. Description of the Related Art

A unit cell of a proton-exchange membrane fuel cell is constituted of a stack body formed by stacking a membrane-electrode assembly (i.e., MEA) and a separator. The MEA includes an electrolyte membrane formed of an ion-exchange membrane, an electrode (i.e., anode, fuel electrode) formed of a catalyst layer which is provided on one surface of the electrolyte membrane, and another electrode (i.e., cathode, air electrode) formed of another catalyst layer which is provided on the other surface of the electrolyte membrane. A diffusion layer is provided between the MEA and the separator. On the separator, a passage for supplying fuel gas (i.e., hydrogen) to the anode, a passage for supplying oxidizing gas (i.e., oxygen, generally, air) to the cathode, and a passage through which a refrigerant (generally, cooling water) passes are formed. A module includes at least one unit cell. A cell stack body is formed by stacking the modules. A terminal, an insulator, and an end plate are provided at each of both ends of the cell stack body in a direction in which cells are stacked (hereinafter, referred to as a "cell stacked direction"). The cell stack body is fastened in the cell stacked direction by using a fastening member (e.g., a tension plate), which is provided outside the cell stack body and which extends in the cell stacked direction, whereby a fuel cell stack is formed. In the proton-exchange membrane fuel cell, the reaction which changes hydrogen to a hydrogen ion and an electron occurs on the anode side, and the hydrogen moves to the cathode side through the electrolyte membrane. The reaction which generates water from oxygen, the hydrogen ion, and the electron (the electron generated on the anode side of the adjacent MEA moves to the cathode side through the separator) occurs on the cathode side.

Anode side: 

Cathode side: 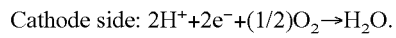

A concave groove and a convex rib are formed on the separator. The concave groove on a surface of the separator which faces the MEA constitutes a gas passage through which reaction gas of the fuel gas or the oxidizing gas passes. The convex rib contacts the diffusion layer, and constitutes a conductive passage. Since the reaction gas is consumed by the power generating reaction, the concentration and the partial pressure of the reaction gas decrease toward the downstream side, and the gas flow speed is then reduced. Also, due to the water generated by the power generating reaction, the possibility that clogging occurs due to moisture in the diffusion layer and the gas passage increases toward the downstream side. Accordingly, it is necessary to prevent the gas flow speed on the downstream side from being reduced. In order to satisfy this condition, Japanese Patent Laid-Open Publication No. 11-16590 discloses a separator passage structure for maintaining the flow speed of the reaction gas by reducing the groove width of the gas passage or by reducing the groove depth.

However, the conventional separator passage structure of the fuel cell has the following problems.

1) When the cross sectional area of the gas passage is changed by changing the gas passage width, the width of the contact area of the electrode with the separator convex rib changes. Therefore, it becomes impossible to maintain the homogeneity of the reaction in the entire cell.

2) When the cross sectional area of the gas passage is changed by changing the depth of the gas passage groove, it is necessary to uniform the thickness of the separator to the thickness of the portion where the gas passage is the deepest in the entire cell surface. (This is because, if the thickness of the separator is changed in the direction perpendicular to the cell stacked direction, the stack is bent when the cells are stacked. Accordingly, the thickness of the separator needs to be constant.) Therefore, the thickness of the separator itself increases, and the entire length of the stack therefore increases. Particularly, in the case of a metal separator, since groove depth is limited due to the limitation on press. Accordingly, when the cross sectional area of the gas passage is changed by changing the depth of the gas passage groove, the amount of change is limited.

SUMMARY OF THE INVENTION

It is an object of the invention to provide a separator passage structure of a fuel cell, which can maintain homogeneity of a reaction in the entire cell, and which makes it unnecessary to increase a thickness of a separator.

An aspect of the invention for achieving the aforementioned objects relates to a fuel cell including a separator on which a gas passage groove is formed. A cross sectional area of a gas passage changes in a direction in which the gas passage groove extends, while each of an opening width of the gas passage groove and a depth of the gas passage groove remains substantially constant.

With the fuel cell according to the above-mentioned aspect, the cross sectional area of the gas passage changes while the opening width of the gas passage groove remains constant. Accordingly, a width of a top surface of a convex rib remains constant in the direction in which the gas passage extends, and a width of a contact area of an electrode and the convex rib of the separator does not change. As a result, homogeneity of the reaction is maintained in the entire cell. Also, the cross sectional area of the gas passage is changed while the depth of the gas passage of a separator base material remains constant. Therefore, unlike the case where there is a change in the depth of the gas passage groove, a thickness of the separator and a length of a stack are not increased even when the depth of the gas passage groove is increased. The fuel cell according to the aspect can be applied to a separator 18 which is constituted of a carbon separator, and to a separator 18 which is constituted by combining a metal separator and a resin frame.

The cross sectional area of the gas passage may be changed such that the cross sectional area of the gas passage on the downstream side in a direction in which the gas flows (hereinafter, referred to as a "gas flow direction") becomes smaller than the cross sectional area of the gas passage on the upstream side in the gas flow direction. Thus, it is possible to maintain the gas flow on the downstream side in the gas flow direction at a high speed. By blowing off the generated water on the downstream side in the gas flow direction, it is possible to diffuse the gas into the diffusion layer, and to maintain the cell performance effectively. Also, the cross sectional area of the gas passage may be decreased gradually, or may be decreased in stepped-stages.

Further, the cross sectional area of the gas passage may be changed by changing an inclination angle of a side surface of the gas passage groove. Thus, it is possible to change the cross sectional area of the gas passage while each of the opening width of the gas passage groove and the depth of the gas passage groove of the separator base material remains substantially constant in the direction in which the gas passage groove extends. Also, the inclination angle of the side surface of the gas passage groove on the downstream side in the gas flow direction may be larger than the inclination angle of the side surface of the gas passage groove on the upstream side in the gas flow direction.

In addition, the gas passage groove may include a curve portion which is a transition portion between the side surface and the bottom surface and which curves, and the cross sectional area of the gas passage may be changed by changing a radius of curvature of at least one curve portion. Thus, the cross sectional area of the gas passage is changed by changing a radius of curvature R of the curve portion of a root portion of the convex rib which is positioned on each of both sides of the gas passage groove. Therefore, it is possible to change the cross sectional area of the gas passage while each of the opening width of the gas passage groove and the depth of the gas passage groove of the separator material remains substantially constant in the direction in which the gas passage groove extends. Also, the radius of curvature of the curve portion of the gas passage groove on the downstream side in the gas flow direction may be larger than the radius of curvature of the curve portion of the gas passage groove on the upstream side in the gas flow direction.

Also, the cross sectional area of the gas passage may be changed by changing the width of the bottom surface of the gas passage groove. Also, the width of the bottom surface of the gas passage groove on the downstream side in the gas flow direction may be smaller than the width of the bottom surface of the gas passage groove on the upstream side in the gas flow direction.

A fuel cell according to another aspect of the invention includes a metal separator on which a gas passage groove is formed, and a cross sectional area of a gas passage changes in the direction in which the gas passage groove extends.

With the fuel cell according to the above-mentioned aspect, it is possible to change the cross sectional area of the gas passage while each of an opening width of the gas passage groove and a depth of the gas passage groove of a separator base material remains substantially constant. The fuel cell according to the aspect can be realized when a separator 18 is formed by combining the metal separator and a resin frame.

The cross sectional area of the gas passage may be changed by changing a thickness of a surface treatment layer of the gas passage groove. Thus, it is possible to change the cross sectional area of the gas passage while each of the opening width of the gas passage groove and the depth of the gas passage groove of the separator material maintain remains substantially constant in the direction in which the gas passage groove extends. Also, the thickness of the surface treatment layer of the gas passage groove on the downstream side in the gas flow direction may be larger than the thickness of the surface treatment layer of the gas passage groove on the upstream side in the gas flow direction.

DETAILED DESCRIPTION OF THE PREFERRED EMBODIMENTS

Hereafter, a separator passage structure of a fuel cell according to the invention will be described with reference to FIG. 1 to FIG. 10. The separator passage structure of a fuel cell according to the invention is applied a proton-exchange membrane fuel cell 10. The fuel cell 10 is mounted, for example, on a fuel cell vehicle. However, the fuel cell 10 may be used for systems other than an automobile.

Figure 1:
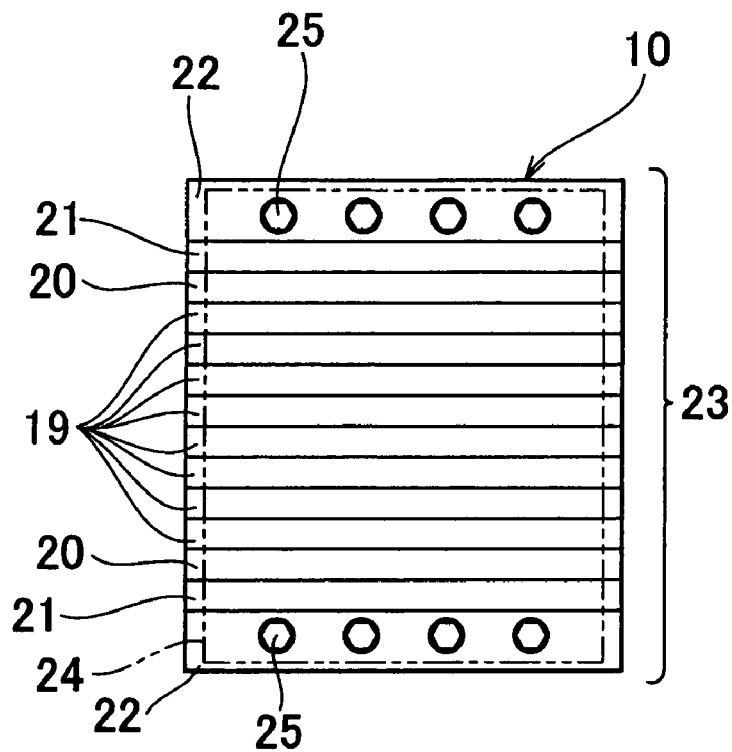
FIG. 1 is a schematic diagram showing an entire fuel cell to which the invention is applied in a manner in which a cell stacked direction is a vertical direction.
Figure 2:
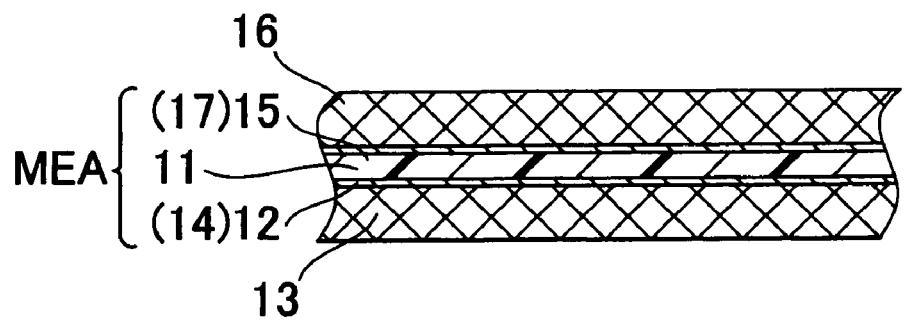
FIG. 2 is an enlarged sectional view showing a part of an electrolyte membrane-electrode assembly of the fuel cell in FIG. 1.

A unit cell 19 of the proton-exchange membrane fuel cell is formed by stacking a membrane-electrode assembly (i.e., MEA) and a separator 18, as shown in FIG. 1 to FIG. 10. As shown in FIG. 2, the MEA includes an electrolyte membrane 11 formed of an ion-exchange membrane, an electrode 14 (anode, fuel electrode) formed of a catalytic layer 12 provided on one surface of the electrolyte membrane 11, and an electrode 17 (cathode, air electrode) formed of a catalytic layer 15 provided on the other surface of the electrolyte membrane 11. A diffusion layer 13 is provided between the electrode 14 and the separator 18. A diffusion layer 16 is provided between the electrode 17 and the separator 18. As shown in FIG. 3 to FIG. 9, on the separator 18, a reaction gas passage 27 for supplying fuel gas (i.e., hydrogen) to the electrode 14, a reaction gas passage 28 for supplying oxidizing gas (oxygen, generally air) to the electrode 17, and a refrigerant passage (i.e., coolant passage) 26 through which refrigerant (generally, coolant) for cooling the fuel cell passes are formed. The refrigerant passage 26 is provided for each cell, or for each group of plural cells. A module includes at least one unit cell (one unit cell constitutes one module shown in the drawings). A module group is formed by stacking the modules. As shown in FIG. 1, a terminal 20, an insulator 21, and an end plate 22 are provided at each of both ends of the cell stack body in the cell stacked direction. The cell stack body is fastened by using a fastening member 24 which is provided outside the cell stack body and which extends in the cell stacked direction (e.g., a tension plate, or a through bolt) and a bolt 25 or a nut, whereby a fuel cell stack 23 is formed.

The catalytic layers 12, 15 are made of platinum (Pt), carbon (C), and an electrolyte. The diffusion layers 13, 16 are made of carbon (C). The separator 18 is constituted of a carbon separator, or a separator formed by combining a metal separator and a resin frame.

As shown in FIG. 3 to FIG. 9, the separator 18 includes a first separator 18A, a second separator 18B, a first resin frame 18C, and a second resin frame 18D. Each of the first resin frame 18C and the second resin frame 18D has a hollow portion at a portion 29 corresponding to a power generation portion 29 of the fuel cell (hereinafter, referred to as "power generation corresponding portion"). The first separator 18A and the first resin frame 18C are provided on the fuel electrode side of the MEA. The first separator 18A separates the fuel gas and the coolant. The second separator 18B and the second resin frame 18D are provided on the air electrode side of the MEA. The second separator 18B separates the oxidizing gas and the coolant. The first separator 18A and the second separator 18B are made of metal. Hereinafter, they will be also referred to as "metal separator 18A" and "metal separator 18B". The first resin frame 18C and the second resin frame 18D are made of resin (nonconductive resin).

Figure 4:
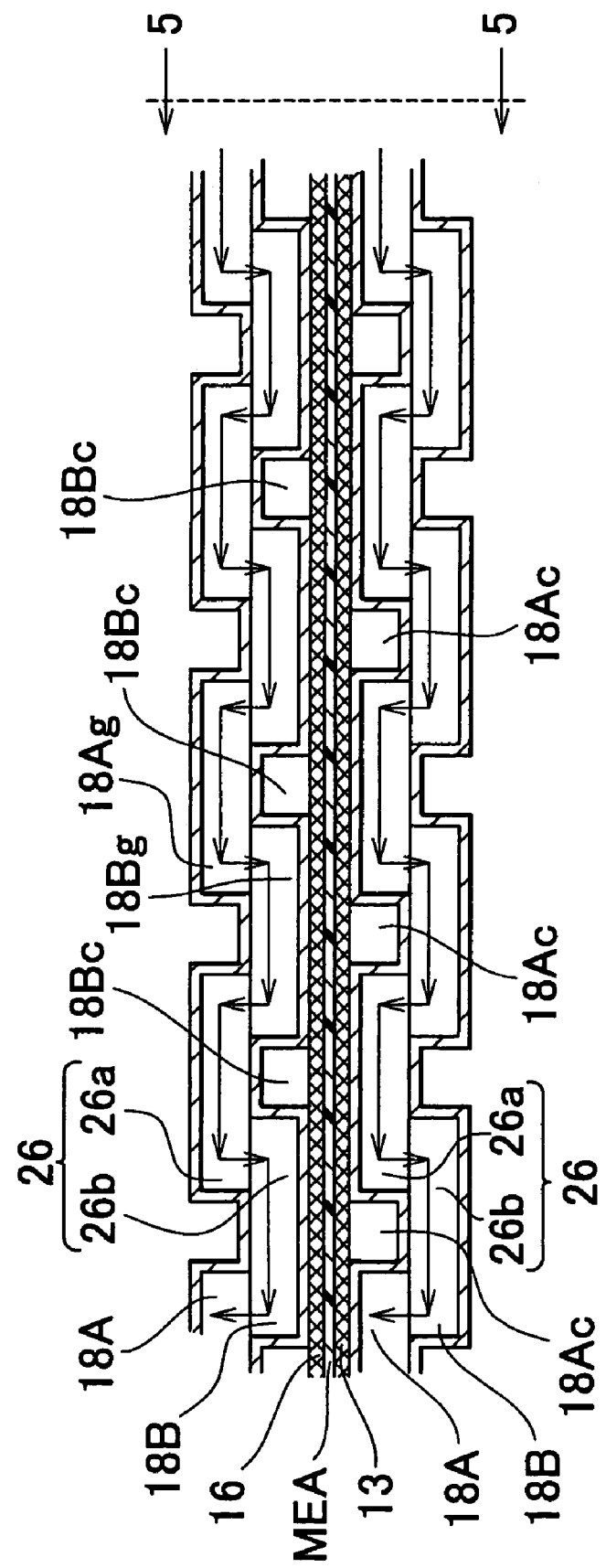
FIG. 4 is a sectional view showing a part of a unit cell to which the separator passage structure of a fuel cell according to the invention is applied, which is taken along line A-A in FIG. 3.
Figure 5:
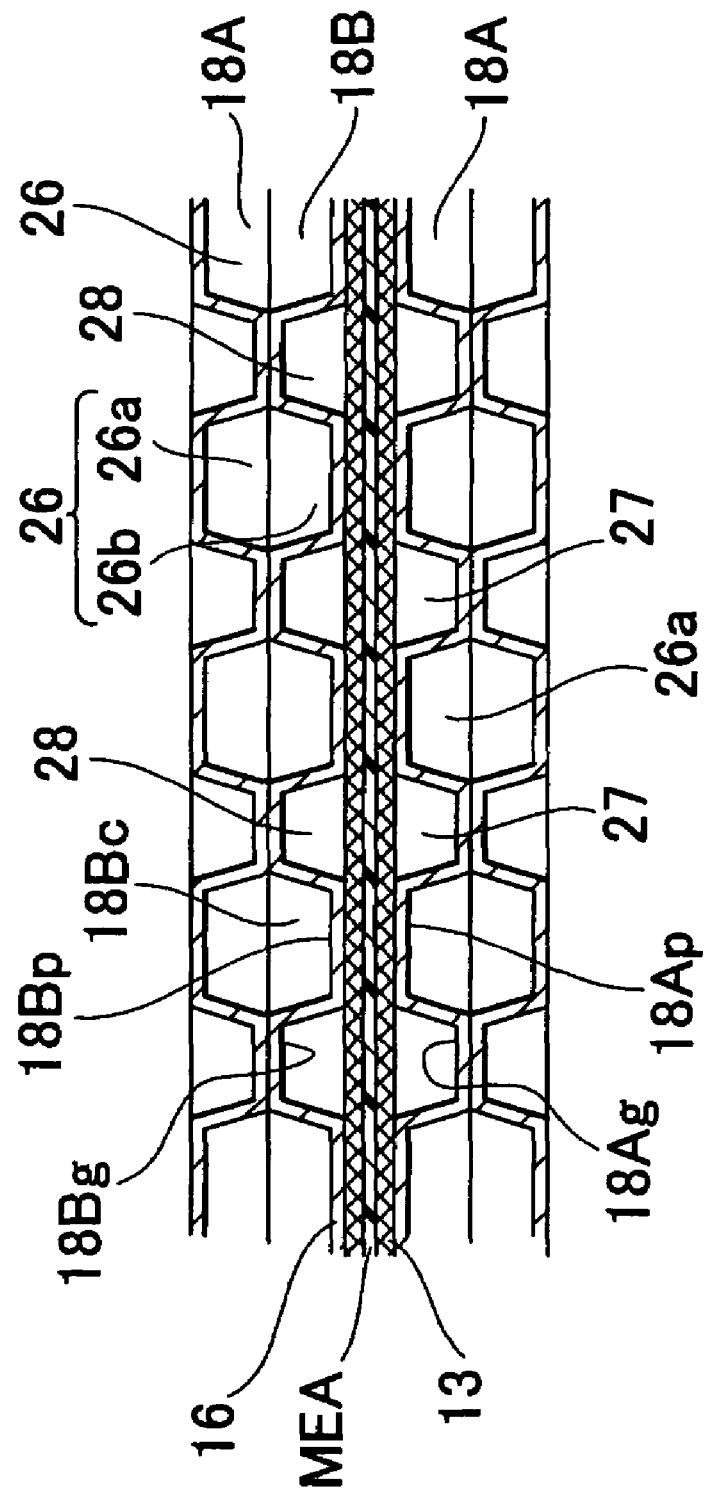
FIG. 5 is a sectional view showing the separator passage structure of a fuel cell in FIG. 4 viewed from a direction "C"
Figure 8:
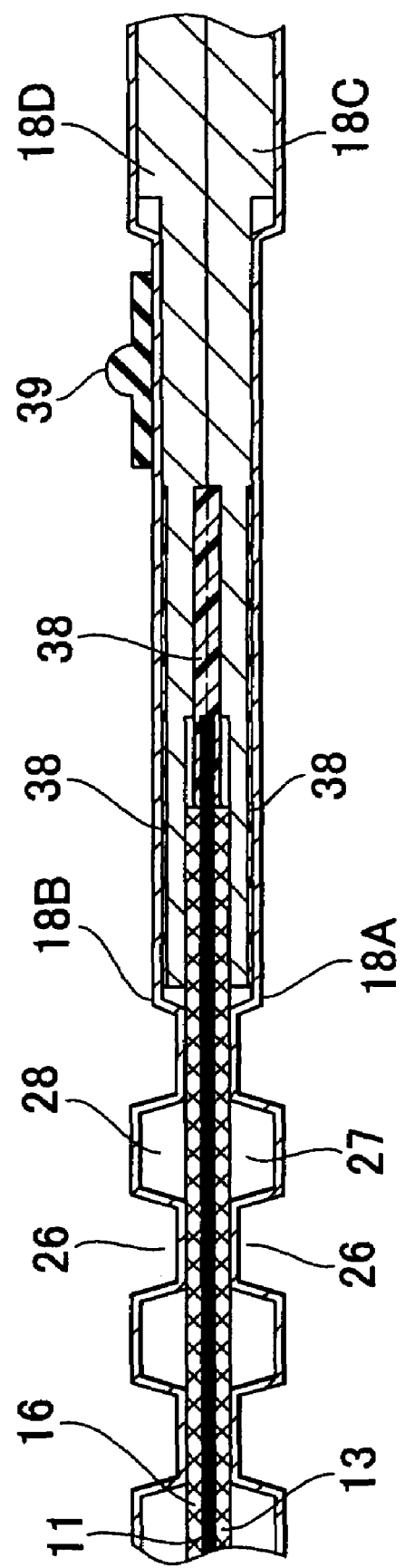
FIG. 8 is a sectional view taken along line D-D in FIG. 7.
Figure 9:
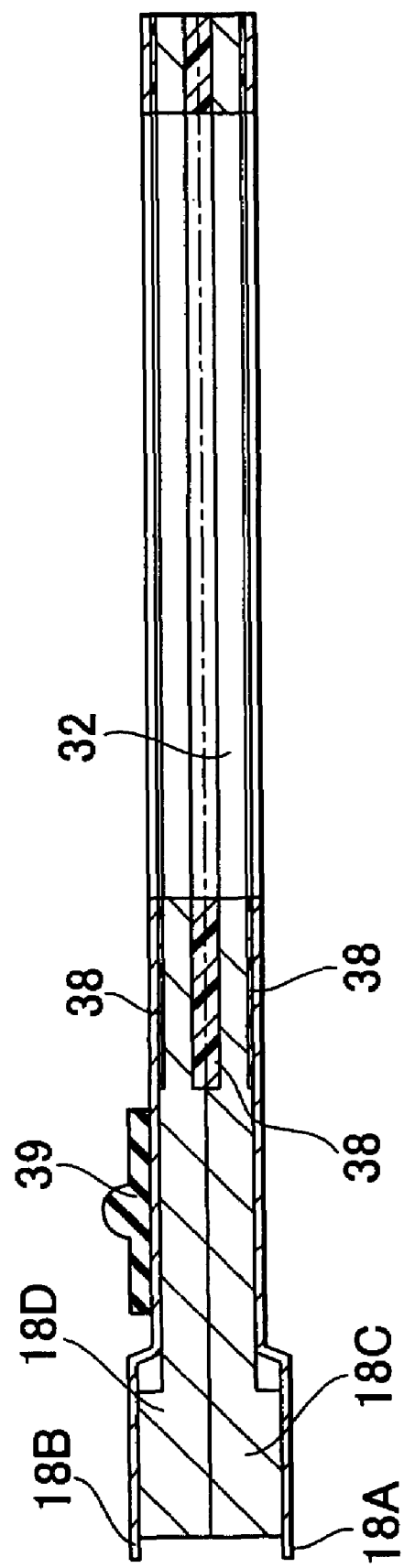
FIG. 9 is a sectional view taken along line B-B in FIG. 7.

The MEA (when the diffusion layers 13, 16 are provided, the MEA and the diffusion layers 13, 16) are sandwiched between the separators 18. When the MEA is sandwiched between the separators 18, the resin frames 18C is provided on the MEA side of the metal separator 18A, and the resin frame 18D is provided on the MEA side of the metal separator 18B. Thus, the metal separator 18A, the resin frame 18C, the MEA, the resin frame 18D, and the metal separator 18B are stacked in this order. At the power generation corresponding portion 29, as shown in FIG. 4 and FIG. 5, since there is a hollow portion in each of the resin frames 18C, 18D, the metal separator 18A, the MEA, and the metal separator 18B are stacked in this order. In a portion other than the power generation corresponding portion 29, as shown in FIG. 8 and FIG. 9, the metal separator 18A, the resin frame 18C, the resin frame 18D and the metal separator 18B are stacked in this order.

Figure 3:
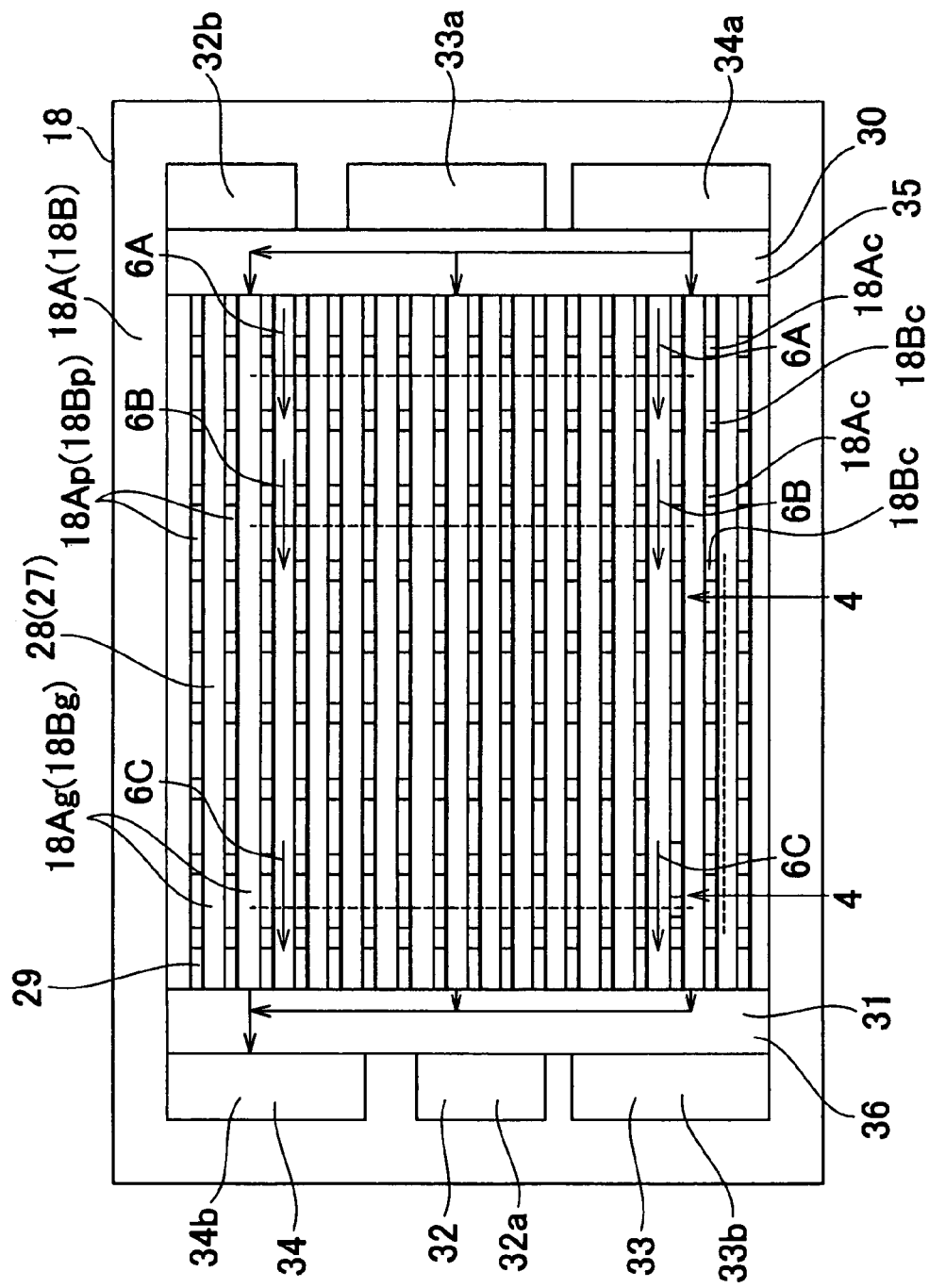
FIG. 3 is a plan view showing a separator to which a separator passage structure of a fuel cell according to the invention is applied.

As shown in FIG. 3 to FIG. 6, in the unit cell 19, concave portions and convex portions (concave grooves and convex ribs) are formed by press molding on the first separator 18A and the second separator 18B. The fuel gas passage 27 is formed on the MEA side of the first separator 18A and the refrigerant passage 26 is formed on the side opposite to the MEA side of the first separator 18A. The oxidizing gas passage 28 is formed on the MEA side of the second separator 18B, and the refrigerant passage 26 is formed on the side opposite to the MEA side of the second separator 18B. Each of the fuel gas passage 27 and the oxidizing gas passage 28 includes a passage group formed by arranging plural passages in parallel. FIG. 3 shows the case where the straight passages are provided. However, serpentine passages may be provided.

As shown in FIG. 3, when the reaction gas passage is a straight passage, a fuel gas inlet to the fuel gas passage 27 and a fuel gas outlet from the fuel gas passage 27 in the power generation corresponding portion 29 of the separator 18 are provided on opposite sides of the portion 29. Similarly, an oxidizing gas inlet to the oxidizing gas passage 28 and an oxidizing gas outlet from the oxidizing gas passage 28 in the power generation corresponding portion 29 of the separator 18 are provided on the opposite sides of the portion 29.

Figure 7:
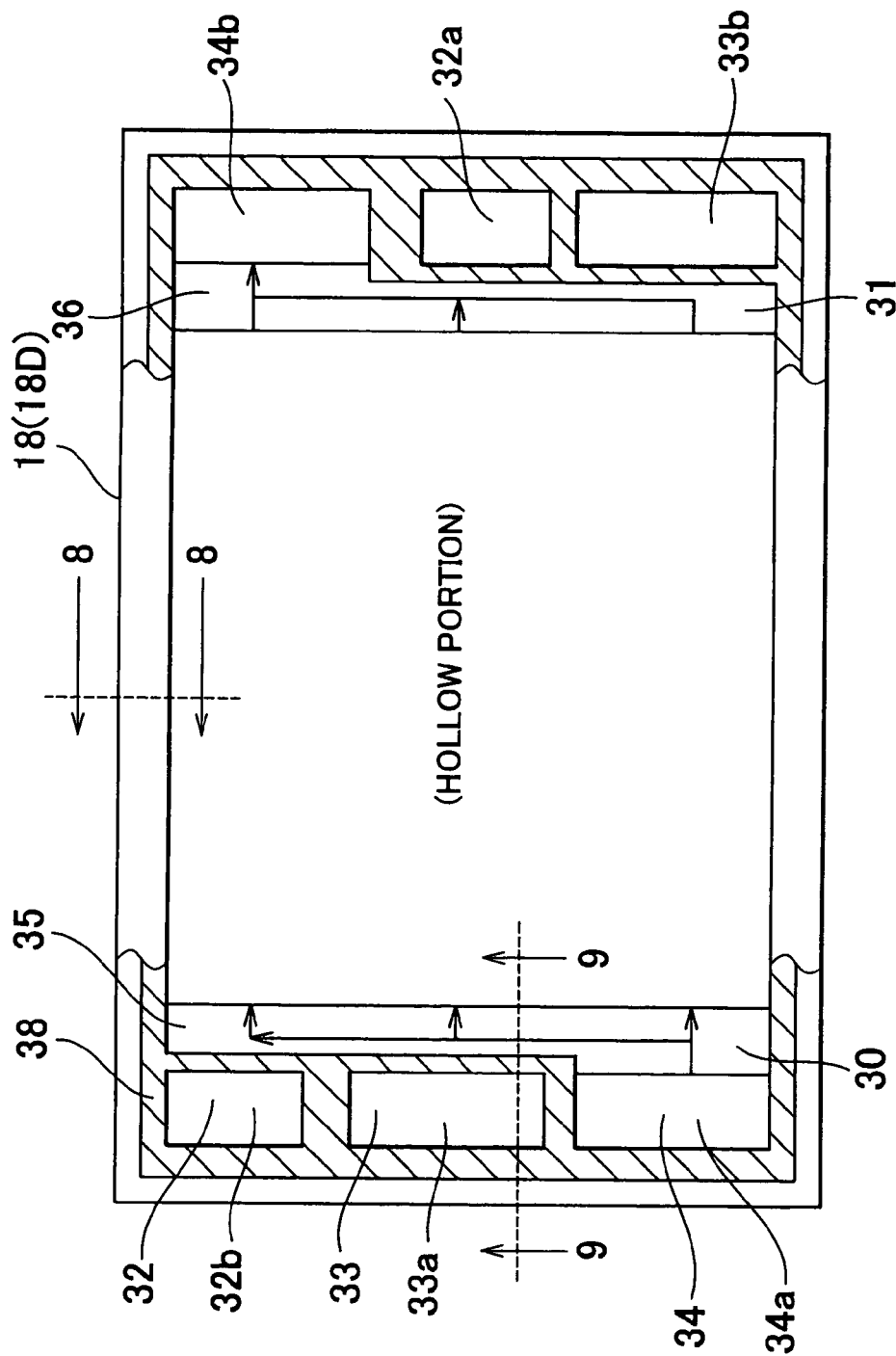
FIG. 7 is a plan view showing a resin frame of the separator of the fuel cell to which the invention is applied.

As shown in FIG. 3 and FIG. 7, a manifold portion is formed in each of facing portions 30, 31 which face each other across the power generation corresponding portion 29 in each of the metal separators 18A, 18B, and the resin frames 18C, 18D. In the manifold portion, a refrigerant manifold 32, a fuel gas manifold 33, and an oxidizing gas manifold 34 are formed. In the facing portion 31, an inlet side refrigerant manifold 32a, an outlet side fuel gas manifold 33b, and an outlet side oxidizing gas manifold 34b are provided. In the other facing portion 30, an outlet side refrigerant manifold 32b, an inlet side fuel gas manifold 33a, and an inlet side oxidizing gas manifold 34a are provided.

As shown in FIG. 7 (FIG. 7 shows the resin frame 18D, but the resin frame 18C is similar to the resin frame 18D), a gas passage communication portion which provides communication between the manifold portion and the gas passage portion is provided in each of the resin frame 18C and the resin frame 18D. In the gas passage communication portion, gas rectifying portions 35, 36 are formed. The gas rectifying portions 35, 36 direct the flow of the gas in a direction perpendicular to a line connecting the facing portions 30 and 31, and allow the gas to flow uniformly between the gas passage portion and the manifold portion in the direction perpendicular to the line connecting the facing portions 30 and 31. The gas rectifying portion 35 allows the gas flowing therein from the inlet side gas manifold to be diffused over the entire width of the gas passage portion and to flow into the gas passage portion. The gas rectifying portion 36 allows the gas flowing therein from the gas passage portion to be concentrated and to flow into the gas manifold.

As shown in FIG. 8 and FIG. 9, a rubber gasket 39 is provided between the metal separators adjacent to each other between the cells such that sealing is provided among the refrigerant manifold 32, the fuel gas manifold 33, and the oxidizing gas manifold 34. As the rubber gasket 39, an O-ring or the like may be used. As shown in FIG. 7, FIG. 8, and FIG. 9, an adhesive sealing portion 38 to which an adhesive agent is applied (a diagonally shaded portion in FIG. 7) is formed in each of the resin frames 18C, 18D so as to provide sealing among the refrigerant manifold 32, the fuel gas manifold 33, and the oxidizing gas manifold 34 by providing sealing between adjacent members (the metal separator or the resin frame) in the cell stacked direction.

The separator passage structure according to the invention is as follows. As shown in FIG. 3 to FIG. 6, in the power generation corresponding portion 29 of the unit cell 19, the first separator 18A which is provided on one side of the MEA includes concave grooves 18Ag and convex ribs 18Ap. The concave grooves 18Ag constitute the fuel gas passage 27. The concave grooves 18Ag and the convex ribs 18Ap are formed alternately. The second separator 18B provided on the other side of the MEA includes concave grooves 18Bg, and convex ribs 18Bp. The concave grooves 18Bg constitute the oxidizing gas passage 28. The concave grooves 18Bg and the convex ribs 18Bp are formed alternately. The concave grooves 18Ag and the concave groove 18Bg open toward the MEA. The top surface of each of the convex rib 18Ap and the convex rib 18Bp contacts the diffusion layer. In the case of the metal separator, the rear surfaces of the convex ribs 18Ap constitute a first refrigerant passage 26a, and the rear surfaces of the convex rib 18Bp constitute a second refrigerant passage 16b.

The first refrigerant passage 26a of the first separator 18A of one cell 19 and the second refrigerant passage 26b of the second separator 18B of the adjacent cell 19 are formed at the same position in the cell stacked direction so as to form the integral refrigerant passage 26. That is, the refrigerant passage 26 on the surface of the power generation corresponding portion 29 of the separator 18A of one cell 19 on the side opposite to the MEA side is not separated from the refrigerant passage 26 on the surface of the power generation corresponding portion 29 of the separator 18B of the adjacent cell on the side opposite to the MEA side, and communication is provided between both the refrigerant passages 26. In one cell 19, the fuel gas passage 27 corresponds to the oxidizing gas passage 28 on the both sides of the MEA.

Fuel gas cross grooves 18Ac are formed on each convex rib 18Ap of the first separator 18A. Oxidizing gas cross grooves 18Bc are formed on each convex rib 18Bp of the second separator 18B. Each of the fuel gas cross grooves 18Ac provides communication between the convex grooves 18Ag constituting the fuel gas passage 27 on both sides of the convex rib 18Ap. Each of the oxidizing gas cross grooves 18Bc provides communication between the concave grooves 18Bg constituting the oxidizing gas passage 28 on both sides of the convex rib 18Bp. The integral refrigerant passage 26 has a cross sectional area which is equal to or larger than that of the first refrigerant passage 26a, and which is equal to or larger than that of the second refrigerant passage 26b at any portion in a direction in which the integral refrigerant passage 26 extends. That is, the cross sectional area of the refrigerant passage 26 is equal to or larger than that of the refrigerant passage 26a, and is equal to or larger than that of the refrigerant passage 26b.

As shown in FIG. 4, the fuel gas cross groove 18Ac formed on the convex rib 18Ap of the first separator 18A and the oxidizing gas cross groove 18Bc formed on the convex rib 18Bp of the second separator 18B are provided at different positions in a direction in which the integral refrigerant passage 26 extends (that is, the position of the fuel gas cross groove 18Ac and the position of the oxidizing gas cross groove 18Bc are deviated from each other). More particularly, as shown in FIG. 4, the fuel gas cross grooves 18Ac of the first separator 18A and the oxidizing gas cross grooves 18Bc of the second separator 18B are alternately positioned in the direction in which the integral refrigerant passage 26 extends. In addition, the fuel gas cross groove 18Ac is positioned at substantially center between the oxidizing gas cross grooves 18Bc on both sides of the fuel gas cross groove 18Ac. Also, the oxidizing gas cross groove 18Bc is positioned at substantially center between the fuel gas cross grooves 18Ac on both sides of the oxidizing gas cross groove 18Bc.

When the first separator 18A and the second separator 18B are metal separators, the gas cross groove 18Ac is formed to have a depth which is equal to the entire height of the convex rib 18Ap, and the gas cross groove 18Bc is formed to have a depth which is equal to the entire height of the convex rib 18Bp. When the first separator 18A and the second separator 18B are metal separators, the concave groove, the convex rib, and the gas cross groove on each of the first separator 18A and the second separator 18B are all formed by press molding a metal sheet.

Figure 6A:
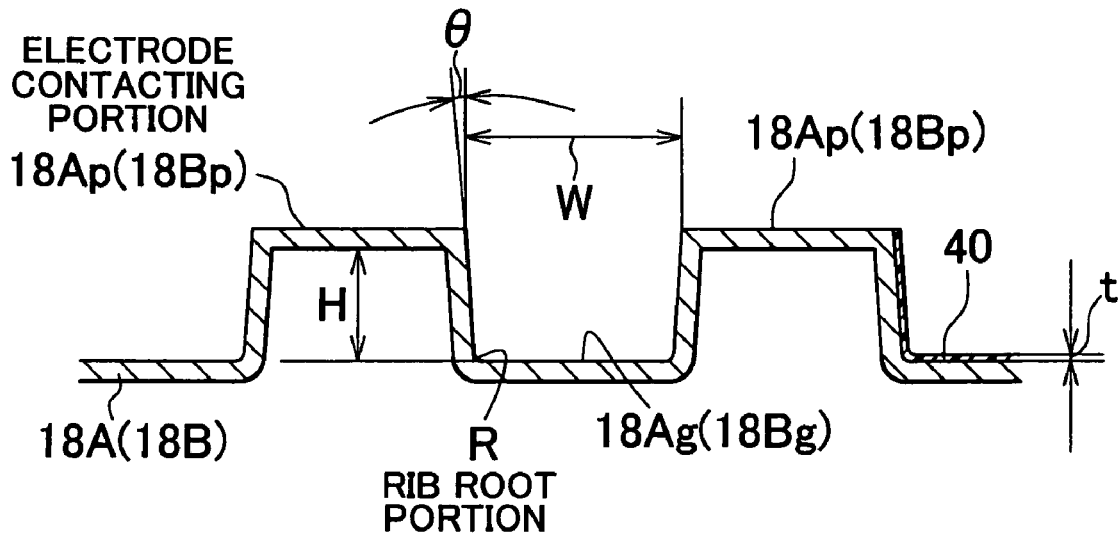
FIG. 6A is an enlarged sectional view of a part of the separator passage structure of a fuel cell according to the invention at an upstream portion, which is taken along line E-E in FIG. 3.
Figure 6B:
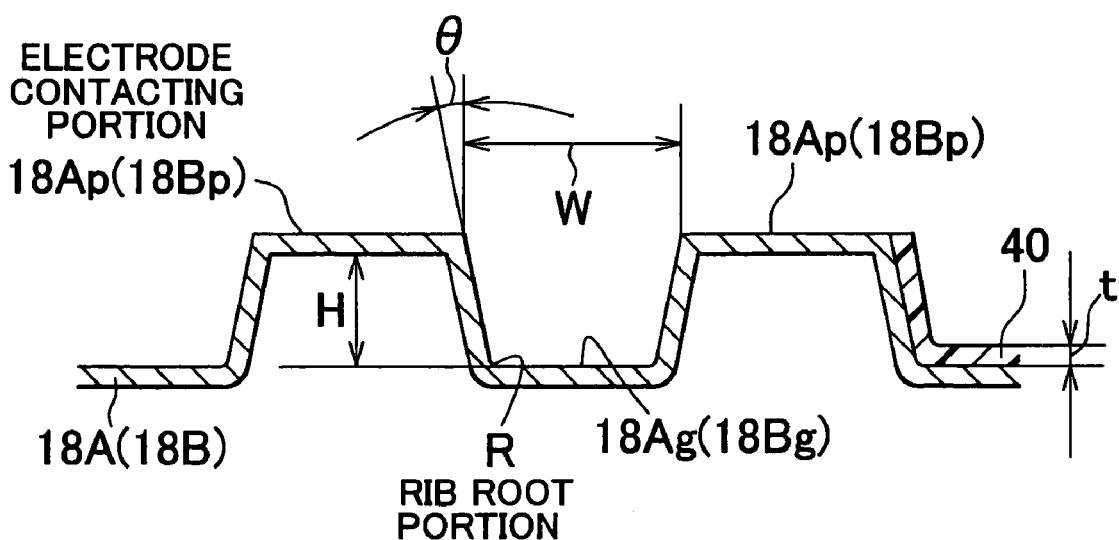
FIG. 6B is an enlarged sectional view of a part of the separator passage structure of a fuel cell according to the invention at a midstream portion, which is taken along line F-F in FIG. 3.
Figure 6C:
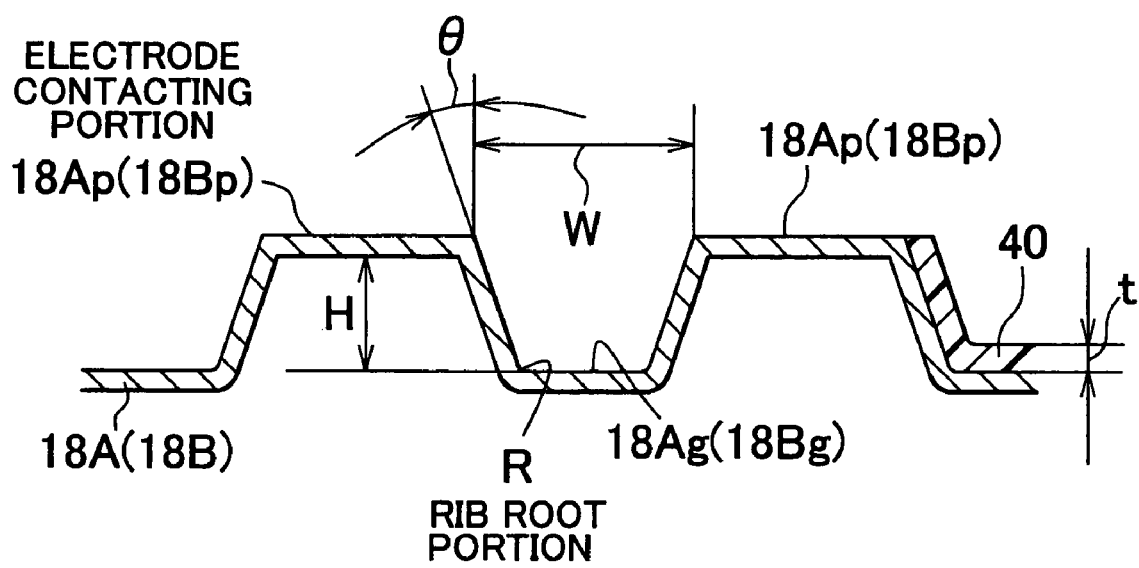
FIG. 6C is an enlarged sectional view of a part of the separator passage structure of a fuel cell according to the invention at a downstream portion, which is taken along line G-G in FIG. 3

As shown in FIG. 6, in the separator passage structure in which the gas passage groove 18Ag is formed on the first separator 18A and the gas passage groove 18Bg is formed on the second separator 18B, each of the opening width W of each of the gas passage grooves 18Ag, 18Bg, and the gas passage groove depth H of the separator base material remains substantially constant in the direction in which the gas passage grooves 18Ag, 18Bg extend. Also, the cross sectional area of the gas passage (the area surrounded by a dashed line in FIG. 6) changes in the direction in which the gas passage grooves 18Ag, 18Bg extend.

The cross sectional area of the gas passage is changed such that the cross sectional area of the gas passage on the downstream side in the gas flow direction becomes smaller than the cross sectional area of the gas passage on the upstream side. For example, FIG. 3 shows the case where oxidizing gas (air) flows in the direction from right to left in the figure. In the case of the oxidizing gas passage 28, the cross sectional area of the gas passage decreases in the direction from right to left in FIG. 3. Also, in the case of the fuel gas passage 27, the cross sectional area decreases in the direction from the upstream side to the downstream side. The cross sectional area of the gas passage may change gradually, may change in stepped-stages, or may change gradually and in stepped-stages. FIG. 6 shows cross sectional areas at portions E, F and G in FIG. 3. The portion E is on the upstream side in the reaction gas flow direction, the portion F is on the midstream side in the reaction gas flow direction, and the portion G is on the downstream side in the reaction gas flow direction. In FIG. 6, the relationship among the cross sectional areas at the portions E, F and G is as follows. (Cross sectional area of gas passage at portion E)≧(cross sectional area of gas passage at portion F)≧(cross sectional area of gas passage at portion G) However, the cross sectional area of the gas passage at portion E is not equal to the cross sectional area of the gas passage at portion G.

As shown in FIG. 6, the cross sectional area of each gas passage (the cross sectional area of each of the passages 27, 28) may be changed by changing the inclination angle of the side surface of each of the gas passage grooves 18Ag, 18Bg. In this case, the cone angle θ of the side surface of each of the gas passage grooves 18Ag, 18Bg with respect to the normal line of the bottom surface of the groove increases toward the downstream in the gas flow direction. Since the opening width W of each of the gas passage grooves 18Ag, 18Bg remains constant, as the inclination angle θ of the side surface of each of the gas passage grooves 18Ag, 18Bg increases, the cross sectional area of each of the gas passage grooves 18Ag, 18Bg decreases.

As shown in FIG. 6, the cross sectional area of each gas passage (the cross sectional area of each of the gas passages 27, 28) may be changed by changing the root portion R (the radius of curvature of the curve of the transition portion between the side surface to the bottom surface of each of the gas passage grooves 18Ag. 18Bg) of each of the convex ribs 18Ap or 18Bp which is positioned on each of both sides of the gas passage groove 18Ag or 18Bg. In this case, the root portion R of each of the convex ribs 18Ap, 18Bp increases toward the downstream direction. As the root portion R of each of the convex ribs 18Ap, 18Bp increases, the cross sectional area of the each of the gas passage grooves 18Ag, 18Bg decreases. As shown in FIG. 6, the cross sectional area of each gas passage (the cross sectional area of each of the gas passages 27, 28) may be changed in combination of changing the inclination angle of the side surface of each of the gas passage grooves 18Ag, 18Bg, and changing the root portion R of each of the convex ribs 18Ap, 18Bp which is positioned on each of the both sides of the gas passage groove 18Ag or 18Bg.

The method in which the cross sectional area of each gas passage (the cross sectional area of each of the gas passages 27, 28) is changed by changing the inclination angle of the side surface of the groove and/or by changing the root portion R of the rib can be adopted regardless of whether the first separator 18A and the second separator 18B are the carbon separators or the metal separators.

As shown in FIG. 6, when the first separator 18A and the second separator 18B are metal separators, the cross sectional area of each gas passage (the cross sectional area of each of the gas passages 27, 28) may be changed by changing a thickness t of a surface treatment layer 40 which is applied to each of the gas passage grooves 18Ag, 18Bg. In the case of the metal separator, a gold, platinum or semiconductor ($IrO_2$) coating is applied to the top surface of the convex rib in order to reduce contact electric resistance of the base material (for example, the material is stainless) to the diffusion layers 13, 16, a carbon coating is further applied in order to suppress elution of the ion, and a conductive resin coating is further applied on top of the carbon coating. On the surface of the concave groove, a surface treatment layer formed of epoxy resin or rubber a coating is formed in order to suppress corrosion, since it is not necessary to provide conductivity to the surface of the concave groove. In this case, the thickness t of the layer can be changed by forming the multiple surface treatment layers and by and changing the number of the layers. For example, when a coating whose thickness is 5 μm is applied 8 times, the entire thickness of the layer is 40 μm. When a coating whose thickness is 5 μm is applied 16times, the entire thickness of the layer is 80 μm. When the thickness t of the surface treatment layer 40 which is provided on each of the gas passage grooves 18Ag, 18Bg is increased toward the downstream side by increasing the number of times of the application of the coating from the upstream side to the downstream side, the cross sectional area of each of the gas passage grooves 18Ag, 18Bg decreases toward the downstream side.

As shown in FIG. 6, the cross sectional area of each gas passage (the cross sectional area of each of the gas passages 27, 28) may be changed by combination of changing the inclination angle of the side surface of each of the gas passage grooves 18Ag, 18Bg, changing the root potion R of the rib of each of the convex ribs 18Ap, 18Bp which is positioned on each of the both sides of the gas passage groove 18Ag or 18Bg, and changing the thickness t of the surface treatment layer 40 which is provided on each of the gas passage grooves 18Ag, 18Bg.

Next, the advantages of the separator passage structure of the fuel cell according to the invention will be described. The fuel gas cross groove 18Ac is formed on the convex rib 18 Ap of the first separator 18A, and the oxidizing gas cross groove 18Bc is formed on the convex rib 18Bp of the second separator 18B. Therefore, even when local flooding occurs on the cell surface and one gas passage 27 is blocked, gas can flow to the adjacent gas passages 27 through the gas cross groove 18Ac. Also, even when local flooding occurs on the cell surface and one gas passage 28 is blocked, gas can flow to the adjacent gas passages 28 through the gas cross groove 18Bc. Accordingly, the flow of the gas can be secured. As a result, there is no possibility that power generation cannot be performed in one entire gas passage 27 or 28 that is blocked duel to flooding. Even when flooding occurs, only part of the gas passage 27 or 28 blocked, and the gas can flow smoothly through the gas passage 27 or 28, except the part blocked due to flooding.

Also, the integral refrigerant passage 26 has a cross sectional area which is equal to or larger than that of the first refrigerant passage 26a, and which is equal to or larger than that of the second refrigerant passage 26b at any portion in the direction in which the integral refrigerant passage 26 extends. Therefore, the integral refrigerant passage 26 is not divided by the gas cross groove 18Ac or 18Bc. As a result, the refrigerant can flow smoothly through the integral refrigerant passage 26. More particularly, the position of the fuel gas cross groove 18Ac of the first separator 18A and the position of the oxidizing gas cross groove 18Bc of the second separator 18B are deviated from each other in the direction in which the integral refrigerant passage 26 extends. Therefore, the integral refrigerant passage 26 is not divided by the gas cross groove 18Ac or 18Bc. Accordingly, the refrigerant can flow smoothly through the refrigerant passage 26. As a result, the fuel gas, the oxidizing gas and the refrigerant can flow smoothly.

More particularly, the position of the fuel gas cross groove 18Ac of the first separator 18A and the position of the oxidizing gas cross groove 18Bc of the second separator 18B are deviated from each other in the direction in which the integral refrigerant passage 26 extends. Therefore, even when one of the refrigerant passages 26a of the first separator 18A and the refrigerant passage 26b of the second separator 18B is divided by the gas cross groove 18Ac or 18Bc, the refrigerant can flow smoothly through the refrigerant passage on the other separator which is not divided. Accordingly, it is not necessary to increase the depth of the refrigerant passage of each of the first and second separators, that is, it is not necessary to increase the thickness of each of the first and second separators, in order to maintain smooth refrigerant flow. Therefore, despite of the provision of the gas cross groove, it is not necessary to increase the size of the stack 23 in the cell stacked direction, and consequently it is possible to maintain the compact size of the stack 23.

Also, the cross sectional area of each of the gas passages 27, 28 is changed while the opening width W of each of the gas passage grooves 18Ag, 18Bg remains constant. Therefore, the width of the top surface of each of the convex ribs 18Ap, 18Bp remains constant in the direction in which the gas passages 27, 28 extend, the width of the contact area of the electrode diffusion layer 13 with the separator convex rib 18Ap, and the width of the contact area of the electrode diffusion layers 16 with the separator convex ribs 18Bp do not change, and the homogeneity of the reaction and the homogeneity of the power generation are maintained in the internal direction of the cell. Also, the cross sectional area of each of the gas passages 27, 28 is changed while the depth H of each of the gas passage grooves 18Ag, 18Bg of the separator base material (the portion which does not include the surface treatment layer 40 is called the "base material") remains constant. Therefore, unlike the case where there is a change in the gas passage groove depth, it is not necessary to increase the thickness of the separator and the length of the stack in accordance with the increase in the depth of the gas passage groove. Accordingly, it is not necessary to increase the thickness of the separator 18, the thickness of the cell 19, and the length of the stack 23 in the cell stacked direction. Consequently, it is possible to maintain the compact size of the stack.

The cross sectional area of each of the gas passages 27, 28 is changed such that the cross sectional area of the gas passage on the downstream side in the gas flow direction becomes smaller than the cross sectional area of the gas passage on the upstream side. Therefore, the gas flow on the downstream side in the gas flow direction is maintained at a high speed. By blowing off the generated water on the downstream side in the gas flow direction, the gas is effectively diffused into the diffusion layers 13, 16, and the cell performance and the power generation performance are effectively maintained even on the downstream side in the gas flow direction.

When the cross sectional area of the gas passage is changed by changing the inclination angle θ of the side surface of each of the gas passage grooves 18Ag, 18Bg, it is possible change the cross sectional area of each of the gas passages 27, 28 while the opening width W of each of the gas passage grooves 18Ag, 18Bg, and the gas passage groove depth H of the separator material remain substantially constant. Similarly, when the cross sectional area of the gas passage is changed by changing the root portion R of each of the convex ribs 18Ap, 18Bp which is positioned on each of the both side of the gas passage groove 18Ag or 18Bg, it is possible change the cross sectional area of each of the gas passages 27, 28 while the opening width W of each of the gas passage grooves 18Ag, 18Bg, and the gas passage groove depth H of the separator material remain substantially constant.

Similarly, when the cross sectional area of the gas passage is changed by changing the thickness t of the surface treatment layer 40 which is provided on each of the gas passage grooves 18Ag, 18Bg, it is possible change the passage cross sectional area of each of the gas passages 27, 28 while the opening width W of each of the gas passage grooves 18Ag, 18Bg, and the gas passage groove depth H of the separator material remain substantially constant.

Figure 10:
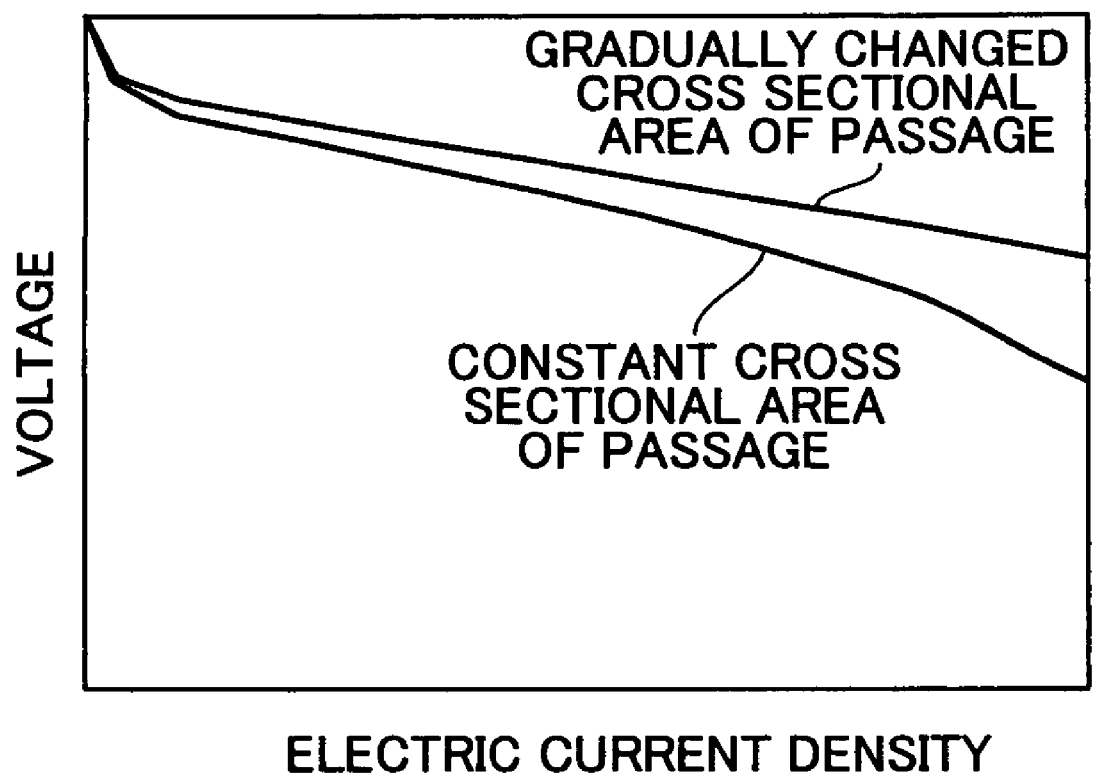
FIG. 10 is a graph showing voltage-electric current characteristics (a) in an embodiment of the invention in which the cross sectional area of the gas passage is gradually changed, and (b) in a comparative example in which the cross sectional area of the gas passage remains constant.

Next, the result of the performance evaluation of the fuel cell according to the change in the cross sectional area of the gas passage is shown in FIG. 10. FIG. 10 shows the voltage-current density characteristics in (1) the fuel cell including the separator according to the embodiment, and in (2) the comparative example. In (1) the fuel cell including the separator according to the embodiment, a stainless plate is used as a metal base material, and the gas passage grooves 18Ag, 18Bg are formed by the concave grooves and convex ribs. In this case, the depth of the passage is 0.5 mm, and the pitch is 2 mm. Also, the inclination angle θ of the side surface of each of the gas passage grooves 18Ag, 18Bg is gradually changed from 5° to 20° from the upstream side to the down stream side. In (2) the comparative example, the depth of the passage is 0.5 mm and the pitch is 2 mm, and the cross sectional area of the gas passage remains constant. As shown in FIG. 10, in (1) the fuel cell including the separator according to the embodiment, even in the high electric current density range where a large amount of water is generated, the gas flows smoothly and the decrease in the voltage is small. However, in (2) the comparative example, in the high electric current density range, the gas flow is interrupted due to flooding, and the decrease in the voltage is large.

What is claimed is:

1. A fuel cell, comprising:
    a separator on which a gas passage groove is formed, a cross-sectional area of a gas passage changes in a direction in which the gas passage groove extends, while each of an opening width of the gas passage groove and a depth of the gas passage groove remains substantially constant,
    wherein the cross-sectional area of the gas passage being changed by changing a thickness of a surface treatment layer formed on a surface of the gas passage groove,
    wherein the surface treatment layer being formed of epoxy resin or rubber and the thickness of the layer can be changed by applying a plurality of layers.

2. A fuel cell, comprising:
    a metal separator including a gas passage groove being formed in the separator, the cross-sectional area of the gas passage groove changes in the direction, in which the gas passage groove extends,
    wherein the cross-sectional area of the gas passage groove being changed by changing the thickness of a surface treatment layer formed on a surface of the gas passage groove,
    wherein the surface treatment layer being formed of epoxy resin or rubber and the thickness of the layer can be changed by applying a plurality of layers.

3. The fuel cell according to claim 2, wherein the thickness of the surface treatment layer of the gas passage groove on a downstream side in the gas flow direction is larger than the thickness of the surface treatment layer of the gas passage groove on the upstream side in the gas flow direction.

* * * * *